(12) United States Patent
Yang et al.

(10) Patent No.: US 12,629,653 B2
(45) Date of Patent: May 19, 2026

(54) COMPOSITE MATERIAL AND METHOD FOR REMOVING POLLUTANT FROM POLLUTED WATER

(71) Applicant: BEIJING UNIVERSITY OF CHEMICAL TECHNOLOGY, Beijing (CN)

(72) Inventors: Xiaojin Yang, Beijing (CN); Jingqi Zhang, Beijing (CN); Tong Zheng, Beijing (CN); Yang Tang, Beijing (CN); Pingyu Wan, Beijing (CN)

(73) Assignee: BEIJING UNIVERSITY OF CHEMICAL TECHNOLOGY (CN)

( * ) Notice: Subject to any disclaimer, the term of this patent is extended or adjusted under 35 U.S.C. 154(b) by 845 days.

(21) Appl. No.: 17/919,239

(22) PCT Filed: Jul. 28, 2020

(86) PCT No.: PCT/CN2020/105234
§ 371 (c)(1),
(2) Date: Apr. 17, 2023

(87) PCT Pub. No.: WO2021/208289
PCT Pub. Date: Oct. 21, 2021

(65) Prior Publication Data
US 2023/0241576 A1 Aug. 3, 2023

(30) Foreign Application Priority Data

Apr. 15, 2020 (CN) .......................... 202010294821.6

(51) Int. Cl.
B01J 20/04 (2006.01)
B01J 20/02 (2006.01)
(Continued)

(52) U.S. Cl.
CPC ........... B01J 20/04 (2013.01); B01J 20/0229 (2013.01); B01J 20/0248 (2013.01); B01J 20/08 (2013.01);
(Continued)

(58) Field of Classification Search
CPC ........ B01J 20/08; B01J 20/04; B01J 20/0229; B01J 20/0248; B01J 20/28004;
(Continued)

(56) References Cited

U.S. PATENT DOCUMENTS

2008/0296237 A1 12/2008 Hammond
2015/0217288 A1* 8/2015 Hutter ..................... C02F 1/288
427/601

FOREIGN PATENT DOCUMENTS

CN 102583659 A * 7/2012
CN 104289708 A * 1/2015
CN 106365291 A * 2/2017 .............. C02F 1/705

OTHER PUBLICATIONS

Translation of CN-102583659-A (Year: 2012).*
(Continued)

*Primary Examiner* — Tri V Nguyen

(57) ABSTRACT

A composite material, wherein the composite material contains aluminum alloys with at least one of alkaline-earth metals and transition metals, and are used for removing pollutants by dissolving to release divalent metal ions, trivalent aluminum ions and hydroxide ions, which contact with other divalent and trivalent metal cations and anions in the contaminated water, to perform an in situ self-assemble of two-dimensional Layered Double Hydroxides (LDH) precipitates; consists of 18-70 weight % of aluminum metal, 30-80% weight of a second type of metal, and 0-2 weight % of an auxiliary agent; has a particle size of 0.01-3 mm; and preferably forms a micro-nano Alloy@LDH composite material with a core-shell structure by pretreating with dilute
(Continued)

Mg-Al alloy MgO/Al₂O₃ Layered Double Hydroxide

HCl. The present invention is used for soil remediation or sewage purification, and is suitable for chemical removal and degradation of complex contaminants from an acidic to alkaline environment.

14 Claims, 7 Drawing Sheets

(51) Int. Cl.

| | |
|---|---|
| *B01J 20/08* | (2006.01) |
| *B01J 20/28* | (2006.01) |
| *B01J 20/30* | (2006.01) |
| *C02F 1/52* | (2023.01) |
| *C02F 1/70* | (2023.01) |
| *C02F 101/10* | (2006.01) |
| *C02F 101/16* | (2006.01) |
| *C02F 101/22* | (2006.01) |
| *C02F 101/30* | (2006.01) |
| *C02F 101/34* | (2006.01) |
| *C02F 101/36* | (2006.01) |
| *C02F 103/06* | (2006.01) |
| *C09K 17/08* | (2006.01) |

(52) U.S. Cl.
CPC ... *B01J 20/28004* (2013.01); *B01J 20/28021* (2013.01); *B01J 20/3021* (2013.01); *B01J 20/3078* (2013.01); *C02F 1/5236* (2013.01); *C02F 1/705* (2013.01); *C09K 17/08* (2013.01); *C02F 2101/103* (2013.01); *C02F 2101/163* (2013.01); *C02F 2101/22* (2013.01); *C02F 2101/305* (2013.01); *C02F 2101/308* (2013.01); *C02F 2101/345* (2013.01); *C02F 2101/36* (2013.01); *C02F 2103/06* (2013.01)

(58) Field of Classification Search
CPC ........... B01J 20/280021; B01J 20/3021; B01J 20/3078; C09K 17/08
USPC ........................................ 252/193
See application file for complete search history.

(56) References Cited

OTHER PUBLICATIONS

Translation of CN-104289708-A (Year: 2015).*
Translation of CN-106365291-A (Year: 2017).*
Li "Mechanistic insight and rapid co-adsorption of nitrogen pollution from micro-polluted water over MgAl-layered double hydroxide composite based on zeolite." Separation and Purification Technology 297 (2022) 121484 (Year: 2022).*
Jung "Efficient removal of iodide anion from aqueous solution with recyclable core-shell magnetic Fe3O4@Mg/Al layered double hydroxide (LDH)." Science of the Total Environment 705 (2020) 135814 (Year: 2020).*

* cited by examiner a) Before reaction   b) After reaction

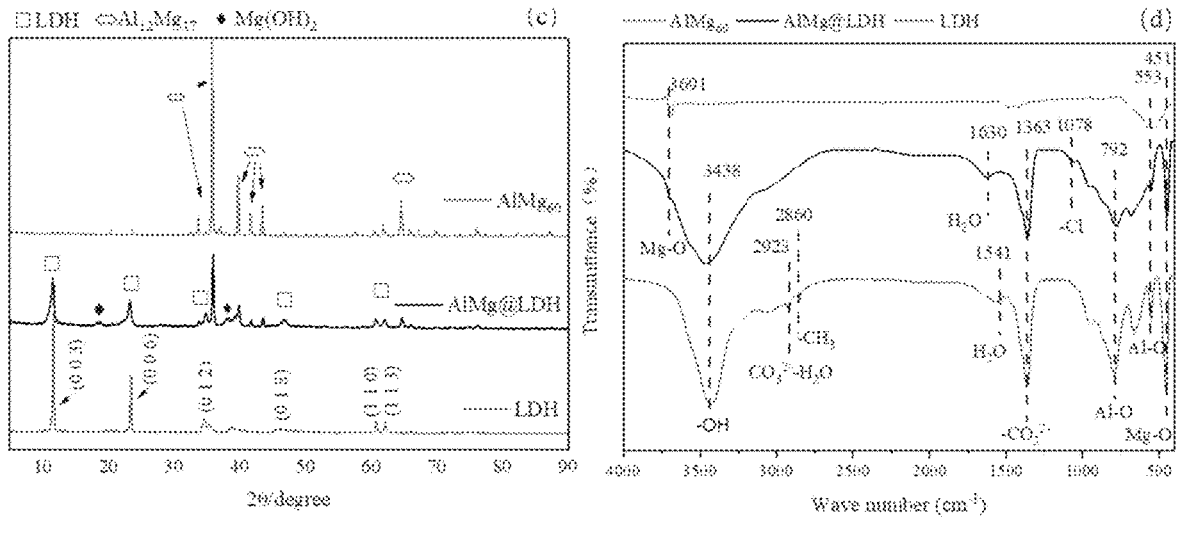
FIG. 16C                                    FIG. 16D
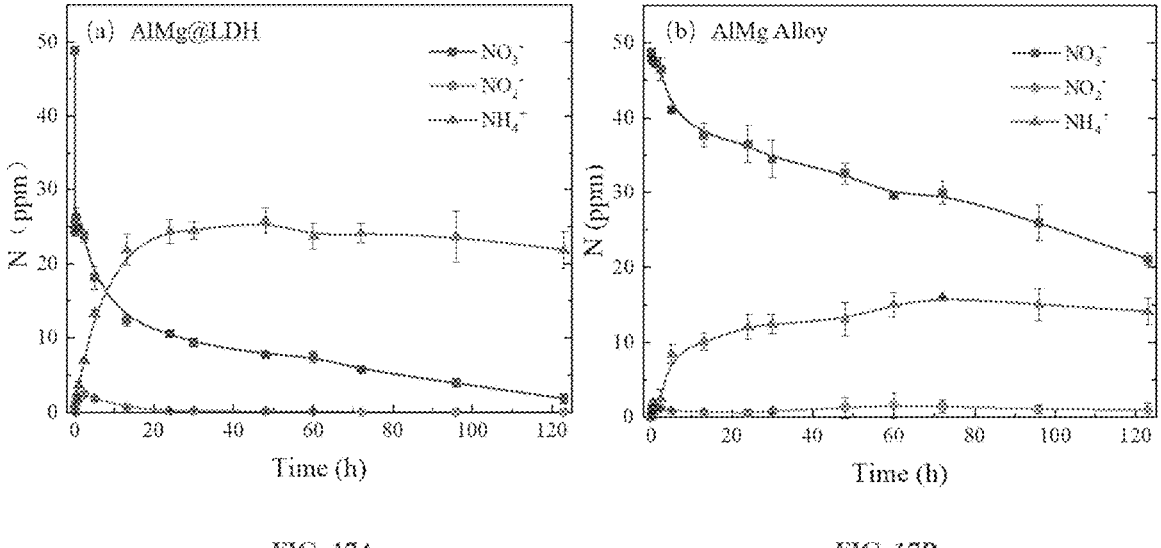
FIG. 17A                                    FIG. 17B

COMPOSITE MATERIAL AND METHOD FOR REMOVING POLLUTANT FROM POLLUTED WATER

TECHNICAL FIELD

The present invention relates to the field of water remediation, more particularly, to a composite material for removing contaminants from contaminated water and method therefor.

BACKGROUND

Water is the source of life and one of the main sources of human diseases (more than 80% of human diseases are related to drinking water). Since the middle of the 20th century, the global environmental contamination has become increasingly serious, and cancer has become a major disease threatening human health and life. The chemical contamination of drinking water is one of the main factors causing cancer. At present, 32% of surface water quality in China is classified as VI, V and worse than V, 91% of groundwater are contaminated in different levels, and 67% of groundwater are seriously contaminated. Groundwater pollution causes 190 million people sickness and 60,000 death each year in China. Groundwater contaminates mainly include heavy metals (hexavalent chromium, copper, cadmium, etc.), organics (chlorinated organic solvents and organic dyes such as methyl orange and methyl blue) and nitrate. Notably, groundwater nitrate contamination has become a global problem threatening human and ecological health. High concentration of nitrate in drinking water can lead to methemoglobinemia, "blue baby" disease and cancer, and nitrate concentration in 27% of China's groundwater exceeds the limit of 10 mg/L for drinking water. Groundwater remediation has become an urgent task in the world.

The main method currently adopted is in-situ remediation for the groundwater remediation by injecting the remediation materials into the underground or filling the permeable reactive barriers. Thus, groundwater contaminants are exposed to the remediation materials and removed by physical and chemical adsorption and chemical degradation and so on. The remediation materials mainly include activated carbon and zero iron powder (ZVI) including nano-zero valent iron (nZVI), which are selectively applied according to the pollution situation.

The advantage of activated carbon is its high specific surface area and good adsorption performance. Physical adsorption is the main mechanism of contaminant removal by activated carbon. Activated carbon is effective in adsorption of hydrophobic organics, but it suffers adsorption saturation and is ineffective for water-soluble inorganics (such as heavy metals, nitrate, pentavalent arsenic, etc.)

Oxidizing contaminants (including inorganic and organic matter, such as copper, hexavalent chromium, trichloromethane, carbon tetrachloride, etc.) are rapidly removed by chemical reduction through ZVI, which has a low standard oxidation potential (−0.44V). Compared with micro ZVI (mZVI), nZVI has a higher specific surface area and better adsorption performance. And nZVI has become a common remediation material in groundwater remediation projects. However, nZVI has several problems in a groundwater remediation process:

1. there are poor removal efficiencies for those heavy metal cations with low oxidation potentials (e.g., cadmium, zinc, nickel);
2. nZVI is only applicable to acidic or weak acidic water, not applicable to alkaline water due to the low reduction activity at alkaline conditions, i.e., only useful for a narrow pH range.

3. nZVI is readily passivated and deactivated and dissolved iron ions cause secondary pollution;
4. nZVI and its reaction product (ferric hydroxide) tend to block groundwater flow channels;
5. nZVI is easy to agglomerate and has low poor mobility;
6. nZVI is expensive and its preservation is costly;
7. nZVI has a relatively high specific surface area but has a low selectivity for contaminants and reacts rapidly with water, leading to its rapid inactivation.

In summary, reduction- or adsorption-based remediation materials (e.g., nZVI, and activated carbon) are not effective for the remediation of groundwater contaminated by complex chemicals, such as pentavalent arsenic, heavy metal cations, oxyanions, organics (chlorinated organics and organic dyes such as methyl orange and methyl blue), nitrate, pesticide residues, bisphenol S and other endocrine disruptors, etc.

Therefore, there is an urgent need to develop new materials for groundwater remediation in a wide pH range, ready-to-use and free secondary pollution.

In order to solve the above problems, the invention is made.

SUMMARY OF THE INVENTION

According to the first aspect of the invention, a composite material for the contaminants removal in water is provided. The composite material includes aluminum source and a second type of metal. Based on the mass percentage, the mass of the aluminum is 18-70% of the composite material, and the mass of the second type of metal is 30-80% of the composite material. The particle size of the composite material is 0.01-3 mm.

Preferably, the second type of metal is selected from alkaline earth metals and/or transition metals. The alkaline earth metals are from one or both of calcium or magnesium, and the transition metals are from one or more of iron, nickel, manganese or zinc.

Preferably, the composite includes an auxiliary agent, which is silicon, silica or stearic acid, based on the mass percentage. The mass of the auxiliary agent does not exceed 2% of the composite.

The second aspect of the invention provides a preparation method of the composite material. The aluminum source and the second type of metal are placed in a ball milling tank. After vacuumed and filled with argon or nitrogen, the tank was rotated at 3000-5000 rpm for 30-120 min. Preferably, when the composite material includes an auxiliary agent, aluminum, the second type of metal and auxiliary agent are simultaneously placed in a ball mill tank during the preparation process.

The third aspect of the invention provides another preparation method of the composite material. The method includes the following steps:

(1) aluminum source and the second metal are put into the sintering furnace, which is vacuumed and filled with argon or nitrogen for 2 to 4 times;
(2) sintering is carried out at a rate of 70-100° C./h to 700-1500° C. and kept for 0.5-3 h;
(3) the sintering furnace is cooled to 200-400° C. at a rate of 100-140° C./h, and then naturally cooled to room temperature;
(4) a particle is broken to less than 3 mm;
(5) the broken particles are put in a ball milling tank. The tank filled is vacuumed and filled with argon or nitrogen. The broken particle is ball milled for 5-30 mins to obtain the composite material.

Preferably, when the composite material includes an auxiliary agent, in the step (5) of the preparation process, an auxiliary agent is added into ball mill tank vacuumed and filled with argon or nitrogen.

Preferably, the aluminum source is elemental aluminum or aluminum-calcium, aluminum-magnesium, aluminum-iron, aluminum-zinc, aluminum-nickel, aluminum-manganese and aluminum-silicon alloy, and the second type of metal source is an alloy consisting of at least one of the elemental calcium, magnesium, iron, zinc, nickel and manganese or alloy including two or more of the elemental calcium, magnesium, iron, zinc, nickel and manganese.

The fourth aspect of the invention provides a method for the composite material to remove contaminants in water. Contaminants in water are removed by REDOX reactions with composite materials. The divalent metal ions, trivalent aluminum ions and hydroxide ions dissolved and released from the composite materials in situ self-assemble with other divalent and trivalent metal cations and anions in contaminated water to form LDH precipitation, which further adsorbs and catalyzes degradation of organic contaminants in water. Organic contaminants mainly refer to chlorinated organic solvents, endocrine disruptors, pesticides and organic dyes.

The contaminants in water are heavy metals, As(V), chlorinated organic solvents, endocrine disruptors, pesticides, organic dyes and/or nitrate. The heavy metal includes heavy metal cation and heavy metal oxygen-containing anion. The heavy metal cation is selected from but not limited to $Cu^{2+}$, $Cd^{2+}$, $Zn^{2+}$ or $Ni^{2+}$, or $Hg^{2+}$, $Pb^{2+}$. The heavy metal oxygen-containing anion is selected from but not limited to $CrO_4^{2-}$ or $Cr_2O_7^{2-}$, namely Cr(VI). The chlorinated organic solvent is selected from but not limited to trichloroacetic acid, trichlorophenol, carbon tetrachloride, 2,4,6-trichlorophenol or 2,4,6-trichlorophenol. The endocrine disruptors are selected from but not limited to bisphenol A and bisphenol S. Most of the organic dyes are anionic and only a few are cationic. Anionic organic dye is selected from but not limited to methyl orange, methyl blue or acid orange 7, and cationic organic dye is selected from but not limited to Rhodamine B. Furthermore, the organics in contaminated water also include pesticide residues, herbicide residues, such as glyphosate.

Among the contaminants, arsenic is a non-metallic element, which usually exists in the form of oxygen-containing anion ($AsO_4^{3-}$) in water. It has the feature of heavy metals, so it is included in the scope of heavy metals (similar to mercury) in some tables.

Among the contaminants, bisphenol A and bisphenol S are endocrine disruptors which interfere with the endocrine system of humans or animals.

In a preferred embodiment of the third aspect of the invention, the contaminated water also includes carbonate ions, bicarbonate ions, sulfate ions or chloride ions.

When the composite material contacts with the contaminated water, REDOX reactions occur between pollutants and composites in water. Specifically, Cr(VI) is reduced to trivalent chromium ions that left in the contaminated water and some unreacted Cr(VI) in contaminated water is left; Some copper ions, cadmium ions, nickel ions or zinc ions are reduced to copper elemental, cadmium elemental, nickel elemental or zinc elemental, and some unreacted copper ions, cadmium ions, nickel ions or zinc ions in contaminated water is left; nitrate is removed by reducing to nitrogen: In chlorinated organic solvents such as trichloroacetic acid or trichlorophenol, the chlorine atoms are replaced by hydrogen atoms, and the formed chloride ions are left in contaminated water. As(V) is reduced to trivalent arsenate ions; Azo bonds are ruptured in anionic organic dyes such as methyl orange, methyl blue or acid orange 7. After the REDOX reaction, trivalent metal ions (trivalent chromium ions, trivalent aluminum ions), divalent metal ions (copper ion, cadmium ion, nickel ions, zinc ions, magnesium ions), interlayer anion (carbonate ions, bicarbonate ions, chloride ion, arsenate anions, Cr(VI), anionic organic dyes) and hydroxyl ions self-assembled to form LDH in water. Due to the large number of interlayer anions in LDHs, cations (cationic organic dyes) that have not been assembled into LDH can be removed by adsorption, and pollutants such as heavy metals; Chlorinated organic solvents, organic dyes or nitrate removed by REDOX reaction and in situ self-assembly LDH in contaminated water; pesticides (glyphosate) and endocrine disruptors (bisphenol A, bisphenol S) removed by REDOX reactions in contaminated water.

At the same time, in addition to the effect of REDOX and self-assembly LDH, the composite material of the invention can adsorb part of contaminates by contacting with contaminated water.

In terms of the metal composition of the alloy, the pH range of the composite material application can be expanded, because aluminum metal is amphoteric metal. Due to the alloy phase, such as $Al_{13}Fe_4$ (which is similar to Pd on catalytic effect), the nitrogen selectivity of $NO_3$ reduction can be improved. The hydrogenation catalytic reduction of chlorinated organics can be improved by the doping of catalytic materials such as nickel. In the later stage, because the LDH is formed by in situ self-assembly, the contaminants (such as $AsO_3^{3-}$) that are difficult to reduce and degrade can be removed by in situ self-assembly LDH. The LDH itself continues to remove contaminants by adsorption, ion exchange, isomorphic substitution or surface complexation. Because LDH is a natural mineral, the risk of secondary contamination is minimal.

In the third aspect of the invention, preferably, the reaction temperature is 15 to 45° C. and the pH of the contaminated water is less than 10.

In the third aspect of the invention, preferably, the contaminated water can be, but is not limited to groundwater, industrial sewage, pit water, tailings water and contaminated surface water. Contaminated water is contacted with composite materials, and divalent metal ions, trivalent aluminum ion and hydroxyl ions are released. The divalent and trivalent cations and anions in contaminated water self-assemble in situ to form layered two-dimensional bimetallic hydroxides, which are deposited at the bottom of static water bodies or downstream of dynamic water bodies. Taking the remediation of contaminated groundwater as an example, the contaminated groundwater is contacted with the composite material by injecting the composite material into the ground or constructing a permeable reactive barrier filled with composite material. REDOX reactions occur between contaminants and composites in contaminated water. The divalent magnesium ions, trivalent aluminum ions and hydroxide ions released by the composite material dissolution, in situ self-assemble with and the divalent and trivalent cations and anions in contaminated water, to form LDH, which is deposited at the bottom of static groundwater bodies or downstream of flowing groundwater bodies.

Compared with the prior art, the invention has the following beneficial effects.

1. Contaminants are removed by a combination of REDOX reactions and in situ self-assembly LDH in this invention. The composite material prepared in the invention has good removal effect on organic dyes (methyl blue), heavy metals [$Cu^{2+}$, $Cd^{2+}$, $Zn^{2+}$, $Ni^{2+}$, Cr(VI), As(V)], chlorinated organic solvents (2,4,6-trichlorophenol), endocrine disruptors (bisphenol S), nitrate and pesticide residues (glyphosate) in groundwater. The composite material has a wide range of applications, especially for the heavy metals and nitrate removal. The nitrate removal rate is close to 100% after reaction 9 h, at initial pH 1.5 and temperature of 15° C., although the nitrate is difficult to remove by reduced iron powder and LDH.

2. Composite prepared in this invention react with contaminants to generate trivalent ions and bivalent ions and anions, which self-assemble to form LDH. The LDH with a large particle size, gradually settle on the bottom of the bottle during the standing process. Use composite prepared in this invention as the remediation material. The contaminated groundwater is contacted with the composite material by injecting the composite material into the ground or constructing a permeable reactive barrier filled with composite material. REDOX reactions occur between contaminants and composites in contaminated water. The divalent magnesium ions, trivalent aluminum ions and hydroxide ions released by the composite material dissolution, in situ self-assemble with and the divalent and trivalent cations and anions in contaminated water, to form LDH, which is deposited at the bottom of static groundwater bodies or downstream of flowing groundwater bodies, and not cause the chroma problem and secondary pollution. In addition, the formed LDH is harmless to the human body.

3. Composites prepared in this invention, can effectively remove pesticides, organic pollutants, nitrate nitrogen, heavy metals, As(V) and endocrine disruptors in acidic, neutral and alkaline water. For composites application, pH range is wide and the remediation way is moderate. Namely, under the moderate condition, composite slow dissolve to generate various ions. Compared with the remediation ways in existing technology used under alkaline conditions, this technology avoid directly dumping of alkali into water and high alkali concentration in local water, which is harm to aquatic ecosystems. The invention is especially suitable for the strongly acidic contaminated water. For the strongly acidic contaminated water, many types of contaminants can be removed, meanwhile, the pH value is stable at 8-9 without additional alkali after remediation, which meets water quality standards. However, the conventional water treatment technology to treat acidic wastewater usually requires additional alkali to neutralize the acid in the water, and the control requirement of the alkali amount is extremely demanding, and it is very easy to cause the pH value of water to exceed the standard.

4. The composite material of the invention for contaminants removal adapt to low water temperature in contaminated water. The composite material prepared by the invention has good removal effect on organic dyes (methyl blue), heavy metals [$Cd^{2+}$, Cr(VI), As(V)], mercury, chlorinated organic solvents (2,4,6-trichlorophenol), endocrine disruptors (bisphenol S), nitrate and pesticide residues (glyphosate) even at the temperature of 15° C. in water. This material with strong practicality is suitable for injecting into the ground or filling a permeable reactive barrier as a remediation material.

5. The composite material used in the invention is cheap and easy to obtain. The preparation process is simple. The product generated after the reaction is LDH, which belongs to a naturally occurring clay, not toxic, not harmful.

BRIEF DESCRIPTION OF THE DRAWINGS

FIG. 1 are a SEM image of composite material sample 1 prepared in Embodiment 1 and a SEM image of a product obtained after reaction of composite material sample 1, in which FIG. 1A is the SEM image of composite material sample 1 in accordance with an example of the invention.

FIG. 1B is the SEM image of product obtained after reaction of composite material sample 1 in accordance with an example of the invention.

FIG. 16C is XRD of Al—Mg alloy and Al—Mg@LDH.

FIG. 16D is FT-IR of Al—Mg alloy and Al—Mg@LDH.

FIG. 17A shows a chemical reduction of nitrate by Al—Mg@LDH (0.5 g Al—Mg@LDH in 50 mL, the alloy is coated with LDH using pH 1 HCl at room temperature for 6 hours). Initial pH 6.04; temperature 25±0.5° C.

FIG. 17B shows a chemical reduction of nitrate by Al—Mg alloy (0.5 g Al—Mg alloy in 50 mL). Initial pH 6.04; temperature 25±0.5° C.

DETAILED DESCRIPTION

Figure 1:
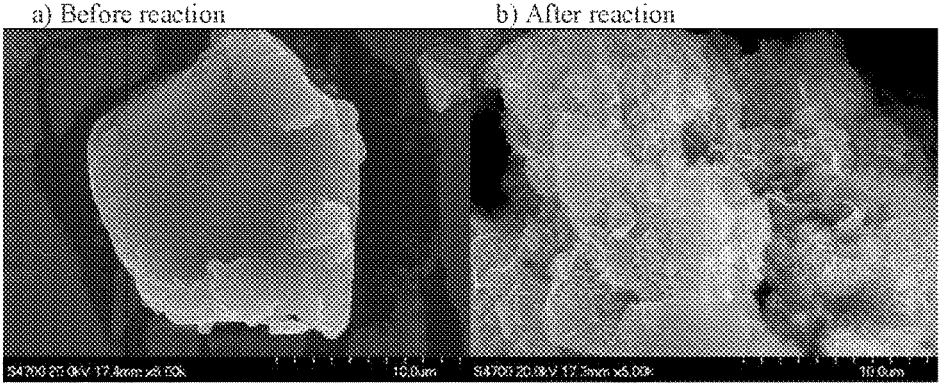
Figure 2:
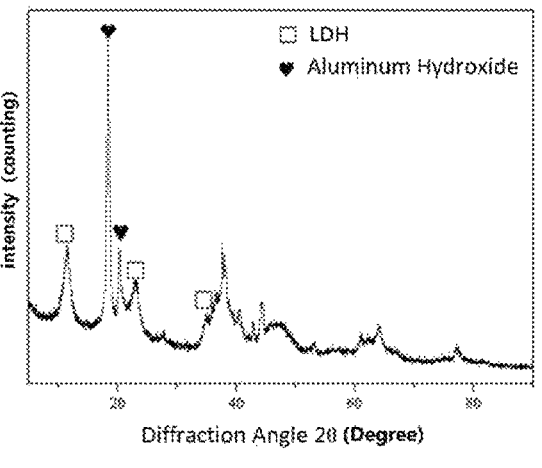
FIG. 2 is the XRD pattern of the reaction products obtained after the reaction of composite material sample 1 in accordance with an example of the invention.
Figure 3:
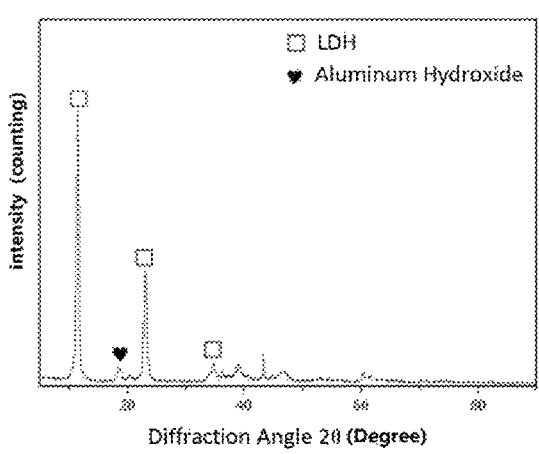
FIG. 3 is the XRD pattern of the reaction products obtained after the reaction of composite material sample 2 in accordance with an example of the invention.
Figure 4:
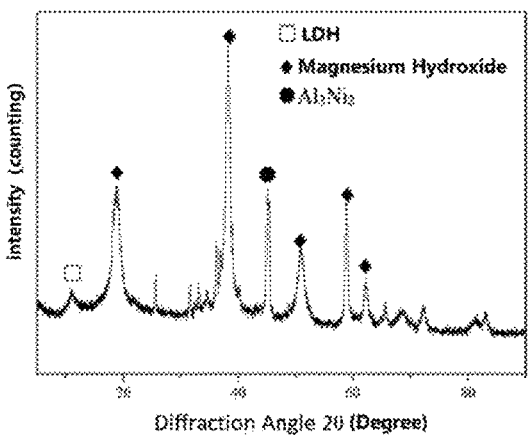
FIG. 4 is the XRD pattern of the reaction products obtained after the reaction of composite material sample 3 in accordance with an example of the invention.
Figure 5:
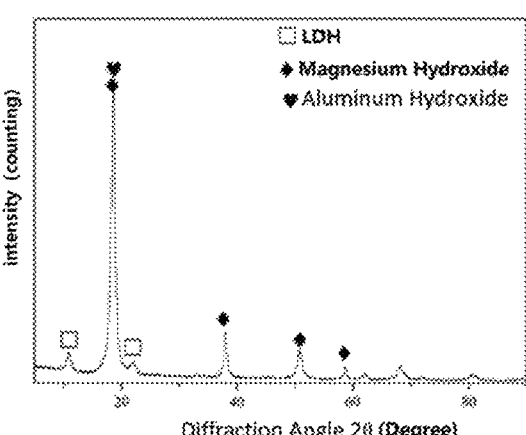
FIG. 5 is the XRD pattern of the reaction products obtained after the reaction of composite material sample 5 in accordance with an example of the invention.
Figure 6:
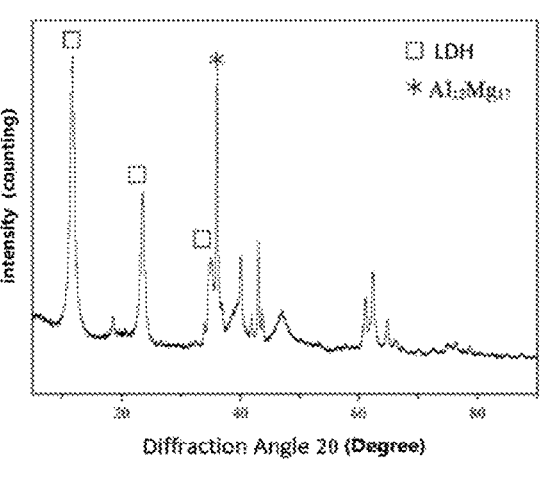
FIG. 6 is the XRD pattern of the reaction products obtained after the reaction of composite material sample 6 in accordance with an example of the invention.
Figure 7:
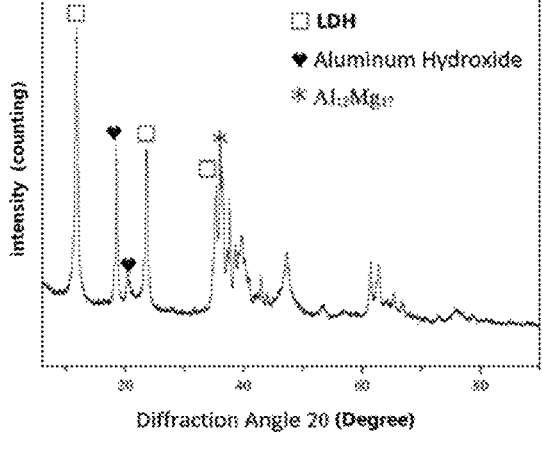
FIG. 7 is the XRD pattern of the reaction products obtained after the reaction of composite material sample 7 in accordance with an example of the invention.
Figure 8:
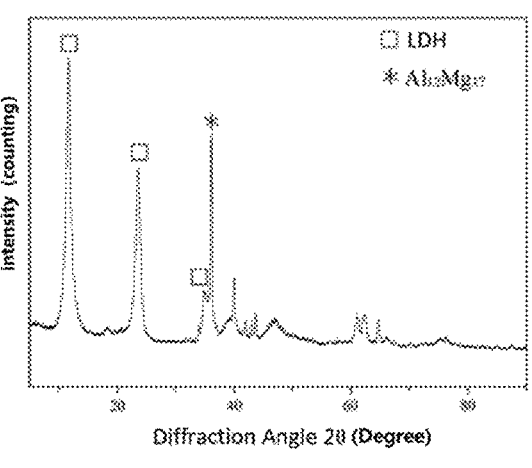
FIG. 8 is the XRD pattern of the reaction products obtained after the reaction of composite material sample 8 in accordance with an example of the invention.
Figure 9:
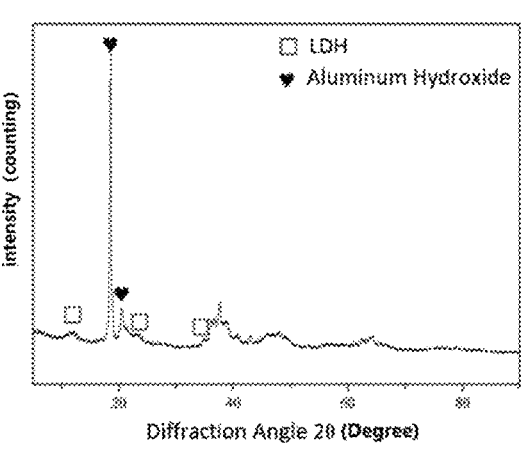
FIG. 9 is the XRD pattern of the reaction products obtained after the reaction of composite material sample 9 in accordance with an example of the invention.
Figure 10:
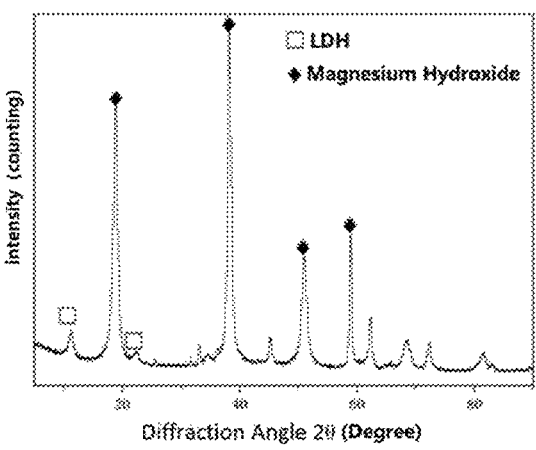
FIG. 10 is the XRD pattern of the reaction products obtained after the reaction of composite material sample 10 in accordance with an example of the invention.
Figure 11:
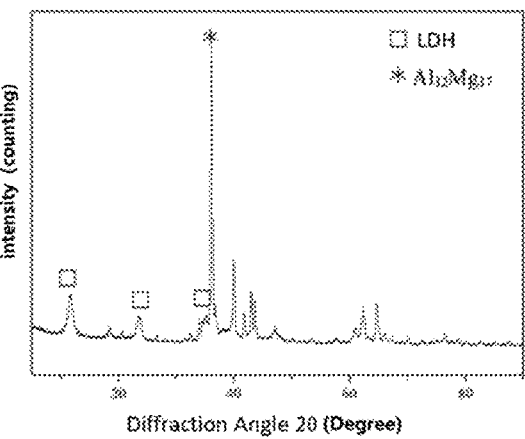
FIG. 11 is the XRD pattern of the reaction products obtained after the reaction of composite material sample 11 in accordance with an example of the invention.
Figure 12:
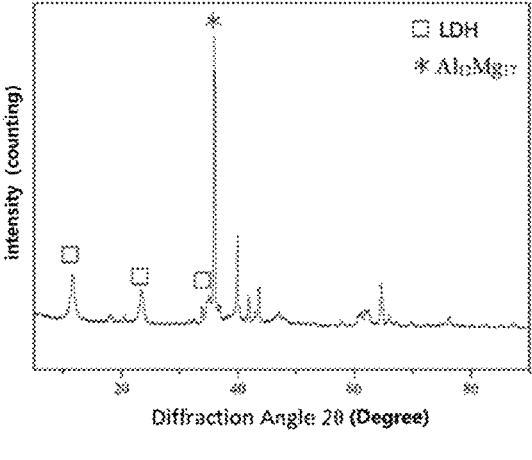
FIG. 12 is the XRD pattern of the reaction products obtained after the reaction of composite material sample 12 in accordance with an example of the invention.
Figure 13:
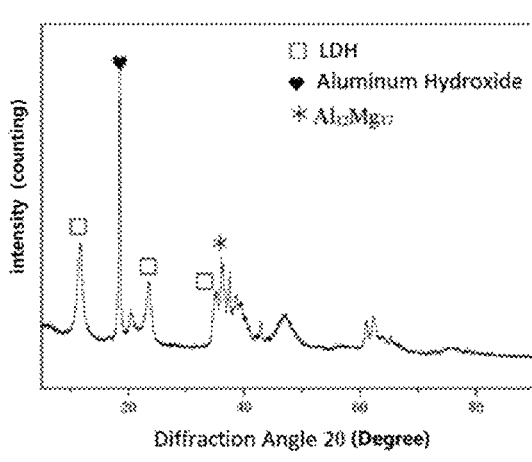
FIG. 13 is the XRD pattern of the reaction products obtained after the reaction of composite material sample 13 in accordance with an example of the invention.
Figure 14:
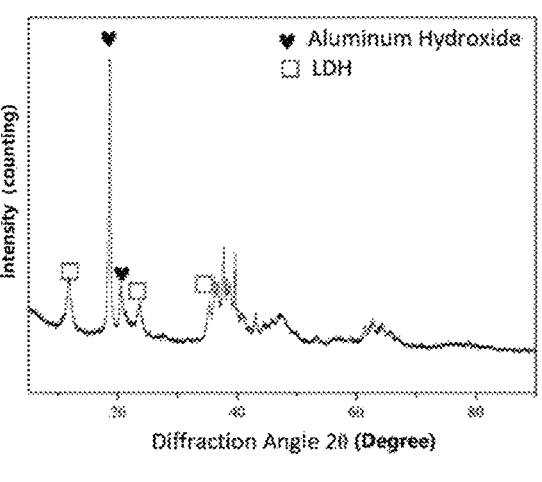
FIG. 14 is the XRD pattern of the reaction products obtained after the reaction of composite material sample 14 in accordance with an example of the invention.
Figure 15:
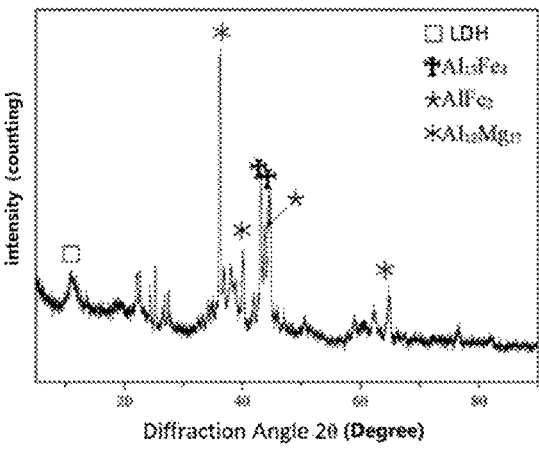
FIG. 15 is the XRD pattern of the reaction products obtained after the reaction of composite material sample 15 in accordance with an example of the invention.
Figure 16A:
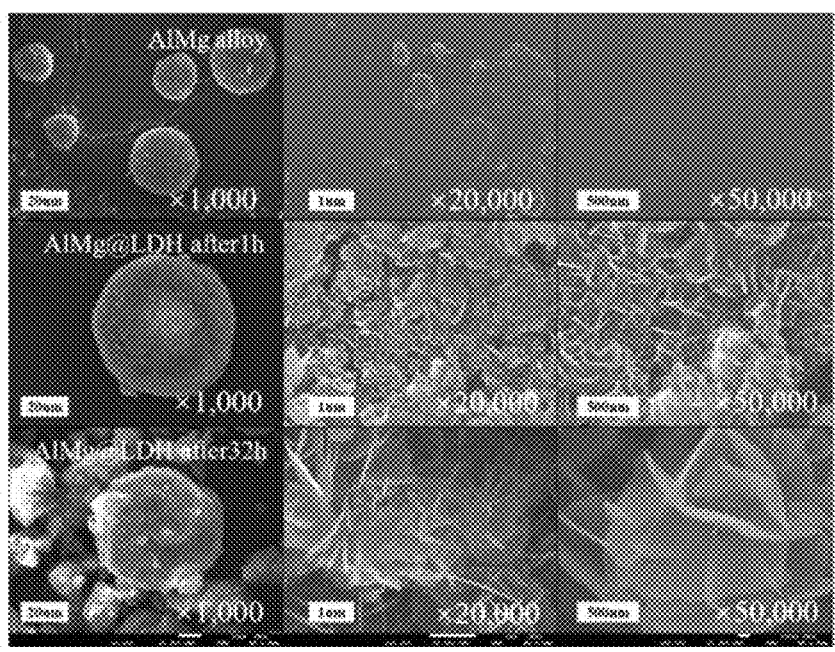
FIG. 16A is SEM micrographs of Al—Mg alloy and Al—Mg@LDH.
Figure 16B:
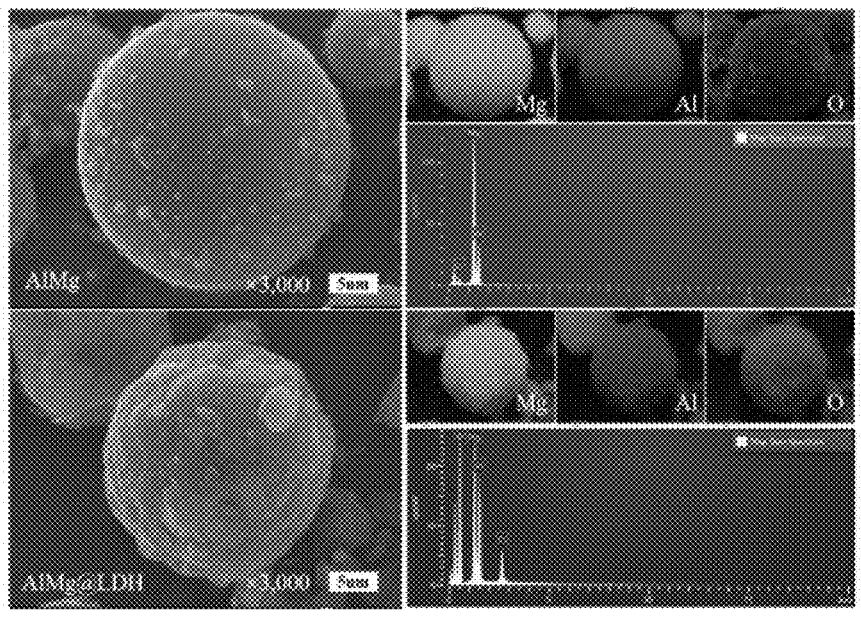
FIG. 16B is SEM-mapping of Al—Mg alloy and Al—Mg@LDH.

The present invention is further explained in detail with the attached drawings and examples. It should be understood that the following examples are used only to illustrate the present invention and are not intended to limit the scope of the present invention in any way.

Example 1-5

Composite Material Samples 1-5 are Prepared by the Following Methods in EXAMPLE 1-5:

To obtain the composite material, the aluminum source, the second type of metal source and the auxiliary agent are placed in the ball milling tank. After vacuumed and filled with argon or nitrogen, the tank was rotated at 3000-5000 rpm for 30-120 min.

The specific preparation conditions are shown in TABLE 1.

TABLE 1

| | | | | | | Preparing Conditions of Composite Material samples 1-5 | | | |
| --- | --- | --- | --- | --- | --- | --- | --- | --- | --- |
| | Preparing Condition | | | | | Product | | | |
| Sample | Aluminum source | The second metal source | Auxiliary agent | Rotating speed (rpm) | Mlling time (min) | Mass fraction of aluminum (%) | Mass fraction of the second metal (%) | Mass fraction of auxiliary agent (%) | Size (mm) |
| Composite material sample 1 | Elemental aluminum | Elemental magnesium | None | 3000 | 30 | 70 | 30 | 0 | 0.3 |
| Composite material sample 2 | Elemental aluminum | Elemental zinc | Stearic acid | 4000 | 60 | 18 | 80 | 2 | 0.1 |
| Composite material sample 3 | Elemental aluminum | Magnesium nickel alloy | Stearic acid | 4000 | 60 | 20 | 79.9 | 0.1 | 0.1 |
| Composite material sample 4 | Elemental aluminum | Iron zinc alloy | Silicon | 4000 | 60 | 20 | 79.9 | 0.1 | 0.1 |
| Composite material sample 5 | Elemental aluminum | Calcium magnesium nickel alloy | Silicon dioxide | 5000 | 120 | 40 | 58 | 2 | 0.01 |

Example 6-15

Composite material samples 6-15 are prepared by the following methods in EXAMPLE 6-15.

(1) Aluminum source and the second metal are put into the sintering furnace, which is vacuumed and filled with argon or nitrogen for 2 to 4 times;

(2) Sintering is carried out at a rate of 70-100° C./h to 700-1500° C. and kept for 0.5-3 h;

(3) A sintering furnace is cooled to 200-400° C. at a rate of 100-140° C./h, then naturally cooled to room temperature;

(4) The particle is broken to less than 3 mm;

(5) Put the broken particles in a ball milling tank. The tank filled is vacuumed and filled with argon or nitrogen. The broken particle is ball milled for 5-30 mins to obtain the composite material.

The specific preparation conditions are shown in TABLE 2.

TABLE 2

| | | | | | | | Preparing Conditions of Composite Material Samples 6-15 | | | |
| --- | --- | --- | --- | --- | --- | --- | --- | --- | --- | --- |
| | Preparing Condition | | | | | | Product | | | |
| Sample | Aluminum source | The second metal source | Auxiliary agent | Calcinating temperature (° C.) | Calcinating time (h) | Mlling time (min) | Mass fraction of aluminum (%) | Mass fraction of the second metal (%) | Mass fraction of auxiliary agent (%) | Size (mm) |
| Composite material sample 6 | Aluminum magnesium alloy | Elemental Calcium and Elemental iron | Silicon | 700 | 0.5 | 5 | 18 | 80 | 2 | 0.3 |
| Composite material sample 7 | Aluminum magnesium alloy | Calcium magnesium alloy | Silicon dioxide | 700 | 0.5 | 10 | 60 | 39.99 | 0.01 | 0.1 |
| Composite material sample 8 | Aluminum magnesium alloy | Magnesium nickel alloy | Stearic acid | 1000 | 1 1 | 15 | 40 | 59.9 | 0.1 | 0.01 |
| Composite material sample 9 | Aluminum magnesium alloy | Iron zinc alloy | None | 1000 | 1 | 25 | 70 | 30 | 0 | 0.01 |

TABLE 2-continued

Preparing Conditions of Composite Material Samples 6-15

| | | | | Preparing Condition | | | | Product | | | |
|---|---|---|---|---|---|---|---|---|---|---|---|
| Sample | Aluminum source | The second metal source | Auxiliary agent | Calcinating temperature (° C.) | Calcinating time (h) | Mlling time (min) | Mass fraction of aluminum (%) | Mass fraction of the second metal (%) | Mass fraction of auxiliary agent (%) | Size (mm) |
| Composite material sample 10 | Aluminum magnesium alloy | Calcium magnesium nickel alloy | Silicon dioxide | 1000 | 2 | 30 | 21 | 78 | 1 | 0.01 |
| Composite material sample 11 | Aluminum iron alloy | Elemental Calcium and Elemental magnesium | Silicon | 1500 | 2 | 5 | 18 | 78 | 2 | 0.1 |
| Composite material sample 12 | Aluminum iron alloy | Calcium magnesium alloy | Silicon dioxide | 1500 | 3 | 10 | 40 | 59.99 | 0.01 | 0.1 |
| Composite material sample 13 | Aluminum iron alloy | Magnesium nickel alloy | Stearic acid | 1500 | 3 | 15 | 40 | 58 | 2 | 0.01 |
| Composite material sample 14 | Aluminum iron alloy | Iron zinc alloy | None | 1500 | 3 | 25 | 70 | 30 | 0 | 0.3 |
| Composite material sample 15 | Aluminum iron alloy | Calcium magnesium nickel alloy | Silicon dioxide | 1500 | 3 | 30 | 21 | 78 | 1 | 0.01 |

Example 16

ZVI, Mg—Al LDH and composite material samples 1-5 obtained from EXAMPLE 1-5 with 1 g for each material, were added to the 100 mL of groundwater solution A. After mixed, the groundwater solution A is adjusted to pH 1.5 by HCl, and reacted for 9 h under 15° C. After the reaction, solid and liquid are separated. Seven group solid and seven group groundwater solution A are collected, respectively.

The groundwater solution A before the reaction was prepared from real groundwater and reagents. The contaminants in the groundwater solution A before the reaction includes Cr(VI), As(V), $Cd^{2+}$, mercury, nitrate, 2,4,6-trichlorophenol, methyl blue, bisphenol S and glyphosate. The concentration of contaminants in the groundwater solution A before and after reaction are shown in TABLE 3. [Among the contaminants, arsenic is a non-metallic element, which usually exists in the form of oxygen-containing anion ($AsO_4^{3-}$) in water. It has the feature of heavy metals, so it is included in the scope of heavy metals in some tables.]

TABLE 3

Concentration of Contaminants in Groundwater Solution after Reaction in EXAMPLE 16

| Contaminants | Heavy Metals | | | | Nitrate (mg/L) | 2,4,6-trichloro-phenol (mg/L) | Methyl blue (mg/L) | Bisphenol S (mg/L) | Glypho-sate (mg/L) |
|---|---|---|---|---|---|---|---|---|---|
| | $Cd^{2+}$ (mg/L) | As(V) (mg/L) | Cr(VI) (mg/L) | Hg (mg/L) | | | | | |
| Solution A before reaction | 20.05 | 20.33 | 19.87 | 5.03 | 24.93 | 19.88 | 20.11 | 20.36 | 24.55 |
| ZVI | 4.86 | <0.02 | 0.50 | <0.02 | 15.40 | 13.72 | <0.04 | 8.78 | <0.2 |
| Mg-Al LDH | 19.76 | 14.44 | 17.86 | 3.77 | 24.55 | 19.55 | 6.66 | 15.66 | 9.38 |
| Composite material sample 1 | <0.02 | <0.02 | <0.04 | <0.02 | <0.05 | 2.24 | <0.04 | 3.42 | <0.2 |
| Composite material sample 2 | <0.02 | <0.02 | <0.04 | <0.02 | <0.05 | 1.54 | <0.04 | 1.60 | <0.2 |
| Composite material sample 3 | <0.02 | <0.02 | <0.04 | <0.02 | <0.05 | 1.33 | <0.04 | 1.60 | <0.2 |
| Composite material sample 4 | <0.02 | <0.02 | <0.04 | <0.02 | <0.05 | 2.23 | <0.04 | 2.08 | <0.2 |

TABLE 3-continued

Concentration of Contaminants in Groundwater Solution after Reaction in EXAMPLE 16

| Contaminants | Heavy Metals | | | | | 2,4,6-trichloro-phenol (mg/L) | Methyl blue (mg/L) | Bisphenol S (mg/L) | Glypho-sate (mg/L) |
| | $Cd^{2+}$ (mg/L) | As(V) (mg/L) | Cr(VI) (mg/L) | Hg (mg/L) | Nitrate (mg/L) | | | | |
| --- | --- | --- | --- | --- | --- | --- | --- | --- | --- |
| Composite material sample 5 | <0.02 | <0.02 | <0.04 | <0.02 | <0.05 | 0.64 | <0.04 | 0.38 | <0.2 |

The SEM images of composite material sample 1 before the reaction and the reaction products obtained after the reaction are shown in FIG. 1A and FIG. 1B, respectively. It can be seen from FIG. 1 that the particle size of composite material sample 1 before the reaction is 0.02-2 mm, and the surface is flat and smooth, while the reaction products obtained after the reaction are typical platelet-like of LDH in shape.

By comparing the data in TABLE 3, the groundwater solution A including $Cd^{2+}$, Cr(VI), As(V), mercury, nitrate nitrogen, 2,4,6-trichlorophenol, methyl blue, bisphenol S and glyphosate is treated with ZVI in 15° C. and initial pH 1.5. Among the contaminants, As(V), mercury, methyl blue and glyphosate are removed efficiently, but nitrate and chlorinated organic solvent (2,4,6-trichlorophenol) which is difficult to degrade are removed inefficiently, especially for nitrate. However, LDH only has effect on methyl blue and glyphosate removal in water, but it has almost no effect on organic solvents (2,4,6-trichlorophenol), endocrine disruptors (bisphenol S), heavy metals [$Cd^{2+}$, Cr(VI), As(V), mercury] or nitrate. In comparison, composite material samples 1-5 prepared by the invention have good removal effects on heavy metals [$Cd^{2+}$, Cr(VI), As(V), mercury], nitrate, methyl blue, bisphenol S, glyphosate removal in groundwater, especially for heavy metals and nitrate. The removal rate of nitrate, which is difficult to remove by both ZVI and LDH, is close to 100% by composite samples 1-5 in 15° C. at initial pH 1.5 after 9 h reaction.

Example 17

Take 1 g of composite material samples 6-10 obtained from EXAMPLE 6-10 and mix them into 100 mL groundwater solution B, and adjust the pH of mixed groundwater solution B to 6 by HCl. The reaction is carried out in 30° C. for 9 h. After the reaction, solid and liquid is separated, and five groups of solid after reaction are collected. five group solid and five group groundwater solution B are collected, respectively.

The groundwater solution B before the reaction was prepared from real groundwater and reagents. The contaminants in the groundwater solution B before the reaction includes $Cu^{2+}$, $Cd^{2+}$, $Ni^{2+}$, $Zn^{2+}$, As(V), Cr(VI), mercury, nitrate nitrogen, 2,4,6-trichlorophenol, methyl blue, bisphenol S and glyphosate. The concentration of contaminants in the groundwater solution B before and after reaction are shown in TABLE 4. [Among the contaminants, arsenic is a non-metallic element, which usually exists in the form of oxygen-containing anion ($AsO_4^{3-}$) in water. It has the feature of heavy metals, so it is included in the scope of heavy metals in some tables.]

TABLE 4

Concentration of contaminants in groundwater solution before and after reaction in EXAMPLE 17

| Contaminants | Heavy metals | | | | | | | Nitrate (mg/L) | 2,4,6-trichloro-phenol (mg/L) | Methyl blue (mg/L) | Bisphenol S (mg/L) | Glypho-sate (mg/L) |
| | $Cu^{2+}$ (mg/L) | $Cd^{2+}$ (mg/L) | $Ni^{2+}$ (mg/L) | $Zn^{2+}$ (mg/L) | As(V) (mg/L) | Cr(VI) (mg/L) | Hg (mg/L) | | | | | |
| --- | --- | --- | --- | --- | --- | --- | --- | --- | --- | --- | --- | --- |
| Solution B before reaction | 20.35 | 21.93 | 19.07 | 23.03 | 21.33 | 17.87 | 4.53 | 25.93 | 18.88 | 19.13 | 21.32 | 25.55 |
| Composite material sample 6 | <0.04 | <0.02 | <0.02 | <0.02 | <0.02 | 1.04 | <0.02 | 18.40 | 8.24 | <0.04 | 4.42 | <0.2 |
| Composite material sample 7 | <0.04 | <0.02 | <0.02 | <0.02 | <0.02 | 3.99 | <0.02 | 15.23 | 7.54 | <0.04 | 4.47 | <0.2 |
| Composite material sample 8 | <0.04 | <0.02 | <0.02 | <0.02 | <0.02 | 0.84 | <0.02 | 10.05 | 2.24 | <0.04 | 2.42 | <0.2 |
| Composite material sample 9 | <0.04 | <0.02 | <0.02 | <0.02 | <0.02 | 5.89 | <0.02 | 12.77 | 2.54 | <0.04 | 2.60 | <0.2 |
| Composite material sample 10 | <0.04 | <0.02 | <0.02 | <0.02 | <0.02 | 1.02 | <0.02 | 8.05 | 1.64 | <0.04 | 1.38 | <0.2 |

Example 18

Take 1 g of composite material samples 11-15 obtained from EXAMPLE 11-15, and mix them into 100 mL groundwater solution C, and adjust the pH of mixed groundwater solution C to 10 by NaOH. The reaction is carried out in 45° C. for 9 h. After the reaction, solid and liquid is separated, and five groups of solid after reaction are collected. five group solid and five group groundwater solution B are collected, respectively.

The groundwater solution C before the reaction was prepared from real groundwater and reagents. The contaminants in the groundwater solution C before the reaction includes Cr(VI), As(V), mercury, nitrate, 2,4,6-trichlorophenol, methyl blue, bisphenol S and glyphosate. The concentration of contaminants in the groundwater solution B before and after reaction are shown in TABLE 4. Because heavy metal cations form precipitation under alkaline conditions, the contaminants in water before reaction do not include heavy metal cations. [Among the contaminants, arsenic is a non-metallic element, which usually exists in the form of oxygen-containing anion $(AsO_4^{3-})$ in water. It has the feature of heavy metals, so it is included in the scope of heavy metals (similar to lead) in some tables.]

TABLE 5

Concentration of Contaminants in Groundwater Solution before and after Reaction in EXAMPLE 18

| Contaminants | Heavy metals | | Nitrate (mg/L) | 2,4,6- Trichlorophenol (mg/L) | Methyl blue (mg/L) | Bisphenol S (mg/L) | Glyphosate (mg/L) |
|---|---|---|---|---|---|---|---|
| | As(V) (mg/L) | Cr(VI) (mg/L) | | | | | |
| Solution C before reaction | 10.99 | 9.78 | 25.03 | 10.04 | 10.09 | 11.33 | 10.28 |
| Composite material sample 11 | <0.02 | 4.03 | 22.05 | 6.84 | <0.04 | 7.41 | <0.2 |
| Composite material sample 12 | <0.02 | 5.91 | 22.53 | 6.94 | <0.04 | 7.46 | <0.2 |
| Composite material sample 13 | <0.02 | 3.02 | 20.85 | 5.24 | <0.04 | 5.42 | <0.2 |
| Composite material sample 14 | <0.02 | 6.87 | 22.97 | 6.98 | <0.04 | 8.00 | <0.2 |
| Composite material sample 15 | <0.02 | 3.05 | 17.05 | 5.64 | <0.04 | 5.38 | <0.2 |

As demonstrated in TABLES 3, 4 and 5, no matter elemental aluminum or aluminum calcium, aluminum magnesium, aluminum iron, aluminum, aluminum zinc, aluminum nickel, aluminum manganese, aluminum silicon alloy are the aluminum source; no matter elemental calcium, magnesium, iron, zinc, nickel, manganese, or alloy composed two or three from calcium, magnesium, iron, zinc, nickel, manganese are the second metal source; no matter composite material samples 1-5 prepared by the first method or composite material samples 6-15 prepared by the second method have a good removal effect on organic dyes (methyl blue), heavy metals [$Cu^{2+}$, $Cd^{2+}$, $Zn^{2+}$, $Ni^{2+}$, Cr(VI), As(V)], chlorinated organic solvents (2,4,6-trichlorophenol), endocrine disruptors (bisphenol S), nitrate and pesticide residues (glyphosate) in groundwater, and have a wide range of applications, especially for the nitrate which is difficult to remove by ZVI in existing technology.

Furthermore, based on the data in TABLES 3, 4 and 5, no matter under the acidic with initial pH 1.5 and low temperature of 15° C., or under the nearly neutral condition with initial pH 6 and temperature of 30° C., or under the alkaline with initial pH 10 and high temperature of 45° C., the composite material sample 1-15 prepared by the invention have the removal effect on organic dyes (methyl blue), heavy metals [$Cu^{2+}$, $Cd^{2+}$, $Zn^{2+}$, $Ni^{2+}$, Cr(VI), As(V)], chlorinated organic solvents (2,4,6-trichlorophenol), endocrine disruptors (bisphenol S), nitrate and pesticide residues (glyphosate) in groundwater. The suitable pH range is wide. The remediation process is mild, that is, the composite material slowly dissolves all kinds of ions during reaction. Compared with parts of the existing technology carried out under alkaline conditions, this material avoids the direct dumping of alkali into the actual water body, high alkali situation in local water body and harm to aquatic ecosystem. In addition, based on the data in TABLES 3, 4 and 5, with the increase of pH, removal efficiency of chlorinated organic solvents (2,4,6-trichlorophenol) and nitrate by composite materials decline slightly. Especially, nitrate can be removed by composite material samples prepared by the invention at initial pH 10, but the removal effect is not good. Thus, the invention is especially suitable for highly acidic contaminated water bodies. For highly acidic contaminated water bodies, not only a variety of contaminants are removed, but also the pH value of treated water bodies is stable at 8-9 without additional alkali, which meets water quality standards. However, the conventional water treatment process to remediate acidic wastewater usually requires additional alkali to neutralize the acid in the water, and the control requirement of the alkali amount is extremely demanding. The pH value can easily exceed the pH value of the water standard under inaccurate control.

The reaction products from composite materials 1-15 after pollutants removal are characterized by XRD and the results are shown in FIG. 2-FIG. 15. The characteristic peaks of LDH indicate that LDH is generated from composite materials 1-15 after the removal process and this is in agreement with the SEM results of FIG. 1. In another words, a REDOX reaction has occurred when the composite materials are exposed to the contaminated water: the reaction releases divalent metal ions, trivalent aluminum ions and hydroxide ions, which, together with other divalent and trivalent metal cations and anions present in the contaminated water, self-assembly in situ to form the precipitates of two-dimensional layered double hydroxides (LDH), which further adsorbs and catalyzes degradation of organic contaminants in water.

On the other hand, both composites prepared by the two methods produce LDH after reacting with contaminated water, which is caused by the combination of ions dissolved from reaction of the alloy with contaminated water, and anions in the water, as mentioned previously. When the aluminum content in the material is high, the product includes aluminum hydroxide, which is due to the high concentration of trivalent aluminum ions and the low concentration of divalent metal ions in the solution are not meet the optimal conditions for LDH preparation (molar ratio of divalent metal ions to trivalent metal ions between 1:4). Some XRD (FIG. 4, 6-8, 11-13, 15) patterns show unreacted alloy phases, such as $Al_{12}Mg_{17}$, which resulted from the short reaction time and incomplete reaction.

Further Invention

CN102583659 discloses an acid-base dual-purpose Fe—Al—C microelectrolytic filler, which is prepared by mixing iron, aluminum and graphite powders in a mass ratio (2-6): (2-6):1. Graphite powers are not one of the components used in the present invention and the mass ratio of iron powder, aluminum powder and graphite powder of CN102583659 is obviously different from those of aluminum, second type metal and the auxiliary agent in the present invention. Fe is the core metal of the components and Al is the second metal in CN102583659 while Al is the core metal and the auxiliary agent is not essential. The technical core concept of the present invention is that the metal components provide electrons for chemical degradation of pollutants and the released divalent and trivalent metal ions self-assembly in situ into Layered Double Hydroxide (LDH). LDH is a general term for Hydrotalcite (HT) and hydrotalcite-like Compounds (HTLCs) and may be transformed into a series of supramolecular materials by intercalation of many other inorganic and organic compounds.

In another example of the invention, prior to use, the composite alloy materials are pretreated by dilute HCl to coat a thin film of LDH on the surface of the alloy particles achieving micro-nano composite with core-shell structures Alloy@LDH. The as-prepared core-shell materials present more efficient remediation.

In a further example according to the invention, composite material composed of an aluminum source and/or a second type of metal source and LDH.

In a further example according to the invention, composite material composed of an aluminum source and/or a second type of metal source, hydrotalcite and auxiliary agent.

Preferably, as the composite material with porous surface structure of the invention, there is of 20 μm-2 mm of particle size and 3-50 m²/g of a specific surface area.

In examples for soil remediation of the invention, achieved beneficial technical effects include that:

1) nitrate is converted into ammonium (ammonium ion), which can be easily adsorbed on the surface of soil colloids, and can also enter a lattice of clay minerals to become fixed ammonium ions, or converted into guano stone to reduce a loss of ammonia and increase effect of nitrogen fixation;

2) increase soil magnesium fertility and beneficial microelement contents to improve soil pH buffer capacity;

3) regulate soil microbial community to promote soil biodiversity;

4) regulate soil porosity, air permeability, and water retention to promote plant growth;

5) for acid sewage, the invention improves a contaminants removal rate and efficiency with a slow release performance and durability;

6) ability to fix and remove heavy metals and other non-metallic contaminants (heavy metals, pesticides, herbicides, antibiotics, dyes, emerging organic pollutants and other complex contaminants) can be greatly improved.

The above advantages of the invention can be confirmed by the following experimental results.

The experimental equipment and measuring apparatus adopted in the invention include oscillator, batch reactor, a toxicity test leaching and measuring cylinder, a volumetric flask and an analytical balance.

The equipment for measuring concentration of contaminants before and after the experiment includes ICP-OES, ICP-MS, LC-MS, GC, HPLC, GC-MS and UV-Vis.

FIG. 2-FIG. 15 show XRD characterization of the reaction products of the composite materials invented in this application with contaminated water, indicating that all of the reaction products contain a certain amount of LDH, featured by the peaks at the diffraction angles 2θ of xx, xx and xx representing the crystal planes of (xxx), (xxx) and (xxx), respectively. For example, 11.6°, 23.4° and 34.9° representing the crystal planes of (003), (006) and (009), respectively.

The products are composites of the alloy, intermetallic compounds such as $Al_3Ni_2$, $Al_{12}Mg_{17}$, $AlFe_2$, $Al_{13}Fe_4$ depending on the alloying metals with Al and the concentration of the alloying metals. The composites of intermetallic compounds and LDH catalyze the transformation of metal species (e.g., chemical reduction of heavy metal ions to zerovalent) and chemical degradation of organic pollutants.

TABLE 6

The concentration in mg/L of the contaminants and final pH of the groundwater sample
treated by composite material 6 in TABLE 2 at initial pH 1.5-6.5 and by ZVI at initial pH 1.5.

| | Cd | Cr(VI) | Ni | As | Al | Fe | 4-Chloro-phenol | Bisphenol S | Glyphosate | pH after reaction |
|---|---|---|---|---|---|---|---|---|---|---|
| Original groundwater | 10 | 50 | 20 | 10 | 1.0 | 150 | 20 | 20 | 20 | — |
| Initial pH 1.5 | <0.01 | <0.02 | <0.05 | <0.02 | <0.1 | <0.2 | <0.5 | <0.5 | <0.5 | 8.3 |
| Initial pH 3.0 | <0.01 | <0.02 | <0.05 | <0.02 | <0.1 | <0.2 | <0.5 | <0.5 | <0.5 | 8.7 |
| Initial pH 5.0 | <0.01 | <0.02 | <0.05 | <0.02 | <0.1 | <0.2 | <0.5 | <0.5 | <0.5 | 8.5 |
| Initial pH 6.5 | <0.01 | <0.02 | <0.05 | <0.02 | <0.1 | <0.2 | <0.5 | <0.5 | <0.5 | 8.4 |
| ZVI pH 1.5 | 2.3 | <0.02 | 4.6 | <0.02 | <0.1 | 350 | <0.5 | <0.5 | <0.5 | 4.2 |

Note:
ZVI = zerovalent iron;
the pH of the groundwater sample is adjusted to 1.5-6.5 and the sample is spiked with Cd, Cr(VI), Ni, As, 4-chlorophenol, bisphenol S and glyphosate in mixtures.

TABLE 6 demonstrate that the concentrations of 10-50 mg/L Cd, Cr(VI), Ni, As, 4-chlorophenol, bisphenol S and glyphosate spiked in a real groundwater are all reduced to <0.1-0.5 mg/L by composite material 6, achieving removal efficiencies of >97.5-99.96% and the concentrations of Al and Fe are reduced to <0.1 and <0.2 mg/L from 1.0 and 150 mg/L, respectively; the final pH is between 8.3 and 8.7. By contrast, the ZVI treatment presents poor efficiencies for Cd (from 10 to 2.3 mg/L, i.e., 77% removal), Ni (from 20 to 4.6 mg/L, i.e., 77% removal), causes a secondary contamination by Fe (from 150 to 350 mg/L) and does not bring the pH to a required pH range of 6-9 to meet the guideline of groundwater. Clearly, the composite material invented in this application is superior to ZVI in water treatment and purification and this is attributed to the redox reactivity of the composite material and in situ generation of hybrid LDH.

TABLE 7

The concentration in mg/L of the contaminants and final pH of the
groundwater sample treated by composite material 8 in
TABLE 2 at initial pH 7.5-11.5 and by ZVI at initial pH 7.5.

| | Cr(VI) | 4-Chlorophenol | Bisphenol S | Glyphosate | pH after reaction |
|---|---|---|---|---|---|
| Original groundwater | 50 | 20 | 20 | 20 | |

TABLE 7-continued

The concentration in mg/L of the contaminants and final pH of the
groundwater sample treated by composite material 8 in
TABLE 2 at initial pH 7.5-11.5 and by ZVI at initial pH 7.5.

| | Cr(VI) | 4-Chlorophenol | Bisphenol S | Glyphosate | pH after reaction |
|---|---|---|---|---|---|
| Initial pH 7.5 | <0.05 | <0.5 | <0.5 | <0.5 | 8.4 |
| Initial pH 10.0 | <0.05 | <0.5 | <0.5 | <0.5 | 9.3 |
| Initial pH 11.5 | <0.05 | <0.5 | <0.5 | <0.5 | 9.6 |
| ZVI pH 7.5 | 30 | 18 | 19 | 16 | 8.5 |

Note:
ZVI = zerovalent iron.

The demonstration experiment in TABLE 7 investigates the removal of Cr(VI), 4-chlorophenol, bisphenol S and glyphosate by composite material 8 at initial pH of 7.5-11.5 and by ZVI at pH 7.5. The results indicate that ZVI is almost not effective while the composite material invented in this application is highly efficient to remove the contaminants at alkaline pH conditions. TABLES 8, 9 and 10 present comparisons of the invented composite material with ZVI at pH 3 and reaction temperatures of 7-28° C., reaction times of 6-15 h and dosages of 0.5-20 g/L, respectively. In all cases, the invented composite materials outperform ZVI in the removal efficiency and secondary contamination. The excellent performance comes from the reactivity of the composite material and in situ LDH.

TABLE 8

Concentration (mg/L) of contaminants and final pH of the groundwater sample treated
by composite material 10 in TABLE 2 at the reaction temperature of 7-28° C. and pH 3.0 and by
ZVI at 25° C. and pH 3.0.

| | Cd | Cr(VI) | Ni | As | Al | Fe | 4-Chlorophenol | Bisphenol S | Glyphosate | pH after reaction |
|---|---|---|---|---|---|---|---|---|---|---|
| Original groundwater pH 3.0 | 10 | 50 | 20 | 10 | 1.0 | 150 | 20 | 20 | 20 | — |
| Reaction temperature 7° C. | <0.01 | <0.02 | <0.05 | <0.02 | <0.1 | <0.2 | <0.5 | <0.5 | <0.5 | 8.3 |
| Reaction temperature 15° C. | <0.01 | <0.02 | <0.05 | <0.02 | <0.1 | <0.2 | <0.5 | <0.5 | <0.5 | 8.7 |
| Reaction temperature 22° C. | <0.01 | <0.02 | <0.05 | <0.02 | <0.1 | <0.2 | <0.5 | <0.5 | <0.5 | 8.5 |
| Reaction temperature 25° C. | <0.01 | <0.02 | <0.05 | <0.02 | <0.1 | <0.2 | <0.5 | <0.5 | <0.5 | 8.4 |

TABLE 8-continued

Concentration (mg/L) of contaminants and final pH of the groundwater sample treated
by composite material 10 in TABLE 2 at the reaction temperature of 7-28° C. and pH 3.0 and by
ZVI at 25° C. and pH 3.0.

| | Cd | Cr(VI) | Ni | As | Al | Fe | 4-Chlorophenol | Bisphenol S | Glyphosate | pH after reaction |
|---|---|---|---|---|---|---|---|---|---|---|
| Reaction temperature 28° C. | <0.01 | <0.02 | <0.05 | <0.02 | <0.1 | <0.2 | <0.5 | <0.5 | <0.5 | 8.8 |
| ZVI Reaction temperature 25° C. | 3.1 | <0.02 | 4.3 | <0.02 | <0.1 | 190 | <0.5 | <0.5 | <0.5 | 4.3 |

Note:
ZVI = zerovalent iron

TABLE 9

The concentration in mg/L of the contaminants and final pH of the groundwater sample
treated by composite material 11 in TABLE 2 at pH 3.0 and in different reaction times of 6-15 h
and by ZVI in 15 h.

| | Cd | Cr(VI) | Ni | As | Al | Fe | 4-Chlorophenol | Bisphenol S | Glyphosate | pH after reaction |
|---|---|---|---|---|---|---|---|---|---|---|
| Original groundwater pH 3.0 | 10 | 50 | 20 | 10 | 1.0 | 150 | 20 | 20 | 20 | — |
| Reaction time 6 h | <0.01 | <0.02 | <0.05 | <0.02 | <01 | <0.2 | <0.5 | <0.5 | <0.5 | 8.1 |
| Reaction time 9 h | <0.01 | <0.02 | <0.05 | <0.02 | <0.1 | <0.2 | <0.5 | <0.5 | <0.5 | 8.6 |
| Reaction time 12 h | <0.01 | <0.02 | <0.05 | <0.02 | <0.1 | <0.2 | <0.5 | <0.5 | <0.5 | 8.7 |
| Reaction time 15 h | <0.01 | <0.02 | <0.05 | <0.02 | <0.1 | <0.2 | <0.5 | <0.5 | <0.5 | 8.9 |
| ZVI Reaction time 15 h | 3.9 | <0.02 | 5.3 | <0.02 | <0.1 | 210 | <0.5 | <0.5 | <0.5 | 4.5 |

Note:
ZVI = zerovalent iron

TABLE 10

The concentration in mg/L of the contaminants and final pH of the groundwater sample
treated by composite material 12 in TABLE 2 at pH 3.0 and in different dosages of 0.5-20 g/L
and by ZVI of 20 g/L.

| | Cd | Cr(VI) | Ni | As | Al | Fe | 4-Chlorophenol | Bisphenol S | Glyphosate | pH after reaction |
|---|---|---|---|---|---|---|---|---|---|---|
| Original groundwater | 10 | 50 | 20 | 10 | 1.0 | 150 | 20 | 20 | 20 | |
| Loading 0.5 g/L | <0.01 | <0.02 | <0.05 | <0.02 | <0.1 | <0.2 | <0.5 | <0.5 | <0.5 | 7.9 |
| Loading 1 g/L | <0.01 | <0.02 | <0.05 | <0.02 | <0.1 | <0.2 | <0.5 | <0.5 | <0.5 | 8.3 |
| Loading 10 g/L | <0.01 | <0.02 | <0.05 | <0.02 | <0.1 | <0.2 | <0.5 | <0.5 | <0.5 | 8.6 |
| Loading 20 g/L | <0.01 | <0.02 | <0.05 | <0.02 | <0.1 | <0.2 | <0.5 | <0.5 | <0.5 | 9.3 |
| ZVI Loading 20 g/L | 2.9 | <0.02 | 4.4 | <0.02 | <0.1 | 290 | <0.5 | <0.5 | <0.5 | 4.2 |

Note:
ZVI = zerovalent iron

The Inventive Concept of "Al—Mg Alloy In Situ LDH" is Firstly Proposed in the Present Application Groundwater remediation has been focusing on the development of nanocomposite materials by combining nZVI with AC or other carbon materials to take the advantages of chemical degradation and adsorption. For example, a Carbo-Iron®, being registered as a trademark in Germany and consisting of nZVI clusters on activated carbon colloids (ACC) has been developed. The composite material is especially designed for the in situ generation of reactive zones and contaminant source removal when applied in groundwater remediation processes. Although nZVI-AC composite materials avoid fast aggregation and agglomeration of nZVI, the reactivity of nZVI and the adsorption capacity of AC in the nZVI-AC nanocomposites are deteriorated. Furthermore, the complicated reparation procedures, high cost, limited lifespan and ecotoxicity of nano-materials are major limitations for these types of composite materials in the field applications.

Both Mg and Al are active metals but they are not applicable in groundwater remediation mainly because Mg metal is such reactive that it reacts rapidly with water while the passivation of Al metal makes it inertness in the most cases of groundwater conditions. Mg and Al alloys have been widely and extensively applied in many fields but they have not been applied in environmental remediation yet. The present invention is to adjust the reactivities of Mg and Al by alloying (the principle is not new) to fit into water and groundwater remediation by physiochemical and redox reactions through the reactivities of Mg—Al alloys to chemically degrade the pollutants and the adsorption, ion-exchange, surface complexation, isomorphous substitution and intercalation of in situ layered double hydroxides (LDH) to remove the primary and secondary contaminants from water (this principle is NEW). Particular Al—Mg alloys are fabricated such that the alloys provide the electrons for the chemical reduction and/or the degradation of pollutants while released $Mg^{2+}$, $Al^{3+}$ and OH ions react to generate in situ LDH precipitates, incorporating other divalent and trivalent metals and oxyanions pollutants and further adsorbing the micropollutants.

Pretreatment to Coat a Thin Film of LDH on a Surface of Alloys

A thin film/layer of LDH is coated on the surface of the alloy particles to fabricate core/shell structures of composite material Al—Mg (@LDH (FIG. 16A, FIG. 16B, FIG. 16C, and FIG. 16D) by pretreating the alloy particles with dilute HCl pH 1-2. The chemical conversion/transformation of pollutants is significantly facilitated by the LDH pre-coated alloys. For example, the rate of nitrate chemical reduction in 10 h is improved by 3 folds using Al—Mg@LDH (FIG. 17A, FIG. 17B).

Merits of the Invention

Figure 18A:
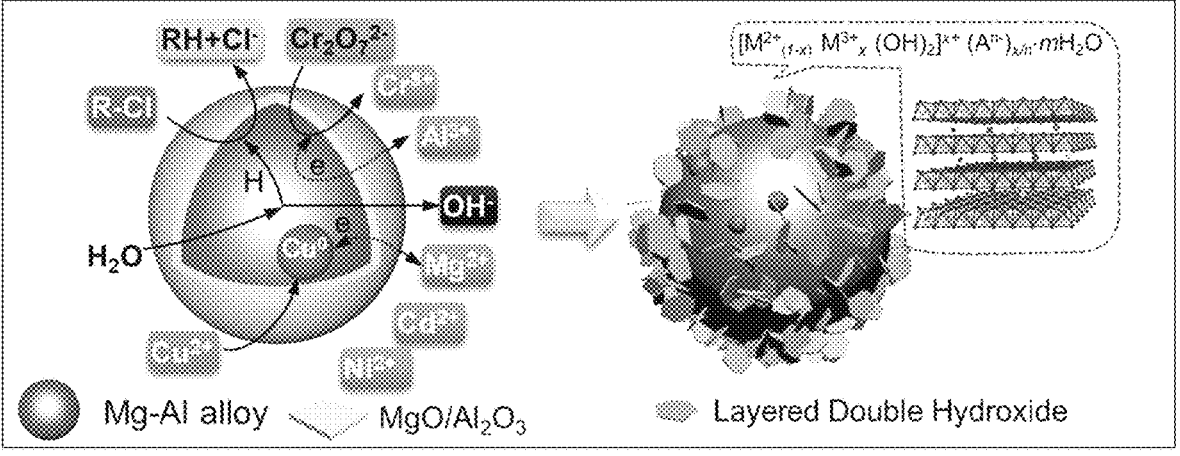
FIG. 18A makes an illustration of Mg—Al alloy and in situ LDH for removing micropollutants.
Figure 18B:
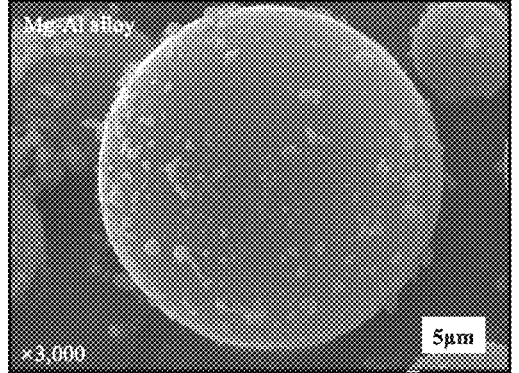
FIG. 18B shows SEM image of Mg—Al alloy particle prior to the pollutant removal process.
Figure 18C:
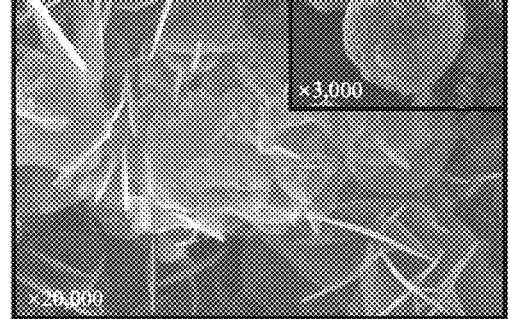
FIG. 18C shows SEM image of Mg—Al alloy particle after the pollutant removal process.

Al and Mg are amphoteric metals such that they are active in acidic and alkaline pH conditions, i.e., they readily provide electrons to pollutants in acidic and alkaline environments. In general, the formation of LDH is a slow process, which requires a timeframe of hours and days depending on the reaction conditions (temperature, metal ions concentration and ratio and aqueous pH). By contrast, iron oxides and ferric hydroxide precipitation occurs instantly on the surface of ZVI and nZVI upon the release of $Fe^{2+}$ at pH above 3.5 and this is the root cause for the passivation of ZVI and nZVI. As such, the surface of Al—Mg alloys is in a continuing renewal via in situ assembly of LDH, a typical molecular formular of which is $M_6Al_2(OH)_{16}CO_3 \cdot 4H_2O$ where M is divalent metal ions, which are the reaction product of the alloy with water and pollutants, and are present in the original water. LDH is highly capable of removing a wide variety of micropollutants (metals, inorganic and organics) by adsorption, ion-exchange, surface complexation, isomorphous substitution and intercalation and chemical catalytic degradation. As such, those pollutants which are not removable by the redox reaction with Al—Mg alloys and the secondary pollutants can be both removed by the in situ LDH (FIG. 18A, FIG. 18B, and FIG. 18C). Consequently, the performance of water remediation is significantly improved by a synergistic effect of Al—Mg alloy and in situ LDH in terms of the pollutant removal efficiency, capability and capacity. In summary, microscale Al—Mg alloy and Al—Mg@LDH particles outperform nanoscale ZVI (nZVI) in water remediation by 1) significantly improving the rheology, mobility and dispersity of the water-remediation material slurry;

2) enabling effective and efficient removal of complex chemical mixtures and a wide variety of pollutants from a wide range of pH environment from acidic to alkaline pH;

3) eliminating secondary contamination and being environmentally benign as LDH is a natural clay.

Figure 19:
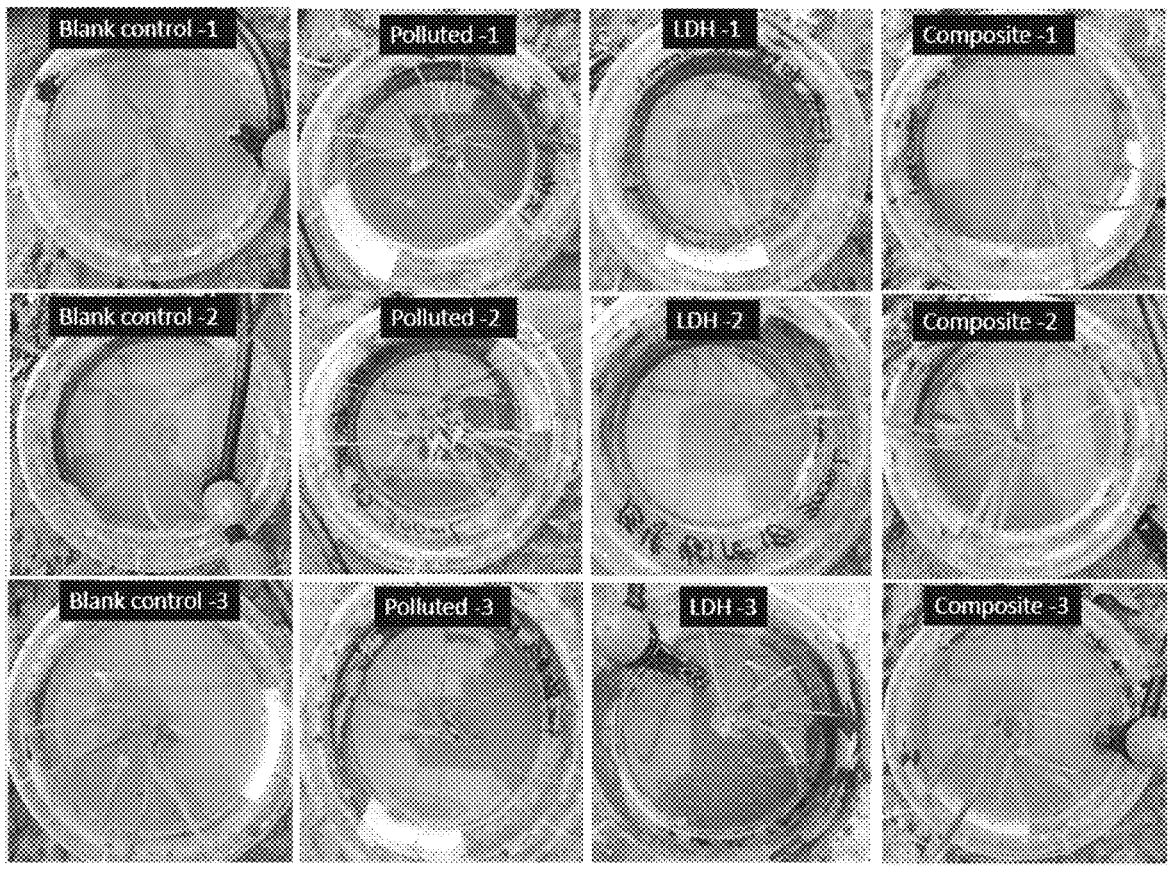
FIG. 19 is a set of rice cultivars photos after 3 days transplanting.
Figure 20:
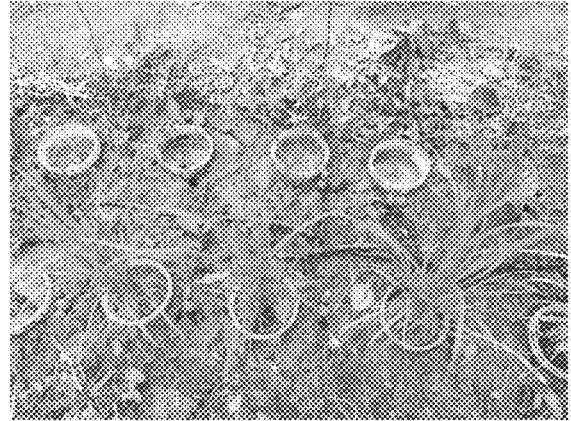
FIG. 20 is a set of rice cultivars photos after 50 days transplanting (upper panel) polluted and added with LDH, (lower panel) polluted and added with composite material.
Figure 21:
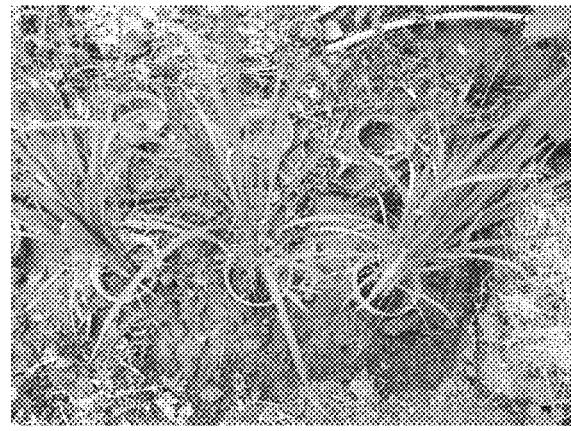
FIG. 21 is a set of rice cultivars photos after 50 days transplanting (upper panel) polluted without remediation material, (lower panel) unpolluted soil.

The super-performance of Al—Mg alloys and in situ LDH is further demonstrated by remediating soils contaminated with 2000 mg/kg $Ni^{2+}$ and 200 mg/kg Bisphenol S. The rice cultivars die in the polluted soils without remediation and added with commercially available LDH at a dosage of 1000 mg/kg soil. By contrast, the rice cultivars are alive and growing well in the unpolluted soils and polluted soils with composite material at the dosage of 1000 mg/kg soil (FIG. 19, FIG. 20 and FIG. 21).

What is claimed is:

1. A composite material which is used for soil remediation or sewage purification, and is suitable for chemical removal and degradation of complex contaminants from an acidic to alkaline environment, wherein the composite material consists of aluminum alloys with at least one of alkaline-earth metals and transition metals, which are used for removal of chemical pollutants by being dissolved to release divalent metal ions, trivalent aluminum ions and hydroxide ions, which contact with other divalent and trivalent metal cations and anions in the contaminated water, so as to perform an in situ self-assemble of two-dimensional Layered Double Hydroxides (LDH) precipitates;

the composite material is with a core-shell structure of Alloy@LDH, and is composed of aluminum core metal, a second type of zerovalent metal, and an auxiliary agent; the auxiliary agent is selected from silicon, silicon dioxide or stearic acid; the aluminum metal comprises 18-70 weight % of the composite material, the second type of zerovalent metal comprises 30-80% weight of the composite material, and the auxiliary agent comprises 0-2 weight % of the composite material;

a source of the aluminum metal is metallic aluminum, aluminum calcium alloy, aluminum magnesium alloy, aluminum iron alloy, aluminum zinc alloy, aluminum nickel alloy, aluminum manganese alloy, or aluminum silicon alloy;

a source of the second type of zerovalent metal is at least one of elemental calcium, elemental magnesium, elemental iron, elemental zinc, elemental nickel and elemental manganese, or an alloy composed of two or more elements of calcium, magnesium, iron, zinc, nickel, and manganese; and the composite material is with a particle size of 0.01-3 mm to remove contaminants at initial pH<10.

2. The composite material of claim 1, wherein the second type zerovalent metal is selected from alkaline earth metals and/or transition metals, the alkaline earth metal is selected from one or two of calcium and magnesium, and the transition metal is selected from one or more of iron, nickel, manganese, zinc.

3. The composite material of claim 1, wherein the composite material is prepared by placing the source of the aluminum metal, the source of the second type of zerovalent metal and the auxiliary agent in a ball milling tank; and making the tank rotated at 3000-5000 rpm for 30-120 min after being vacuumed and filled with argon or nitrogen.

4. The composite material of claim 1, wherein the composite material is prepared by 1) Putting the source of the aluminum metal and the source of the second type of zerovalent metal into a sintering furnace, which is vacuumed and filled with argon or nitrogen for 2 to 4 times;

2) Sintering a mixture of the source of the aluminum metal and the source of the second type of zerovalent metal at a rate of 70-100° C./h to a sintering temperature 700-1500° C. and keeping sintering for 0.5-3 h;

3) Cooling the sintering furnace to 200-400° C. at a rate of 100-140° C./h, and then cooling the sintering furnace naturally to a room temperature;

4) Breaking the mixture sintered into powders with particle sizes of less than 3 mm; and 5) Putting the powders and auxiliary agent into a ball milling tank, which is vacuumed and filled with argon or nitrogen; and making the same ball milled for 5-30 mins, so as to obtain the composite material.

5. The composite material of claim 1, wherein the sewage purification is used to remove contaminants from the contaminated water or soil via a REDOX reaction between the contaminants and the composite material, in which metal components are dissolved to make divalent metal ions and trivalent aluminum ions released to be further in situ self-assembled, so as to form two-dimensional, layered hydroxides, which further remove contaminants that are difficult or not removable by the REDOX reaction and degraded products and byproducts of primary contaminants through adsorption, co-precipitation, surface complexation, isomorphic substitution, intercalation and chemical catalytic degradation.

6. The composite material of claim 1, wherein the contaminants include heavy metals, chlorinated organic solvents, organic dyes, pesticides, endocrine disruptors, pentavalent arsenic, and/or nitrate.

7. The composite material of claim 1, wherein the contaminants include carbonate ions, bicarbonate ions, sulfate ions, or chloride ions.

8. The composite material of claim 1, wherein the contaminated water includes groundwater, industrial sewage, mine water or pit water, tailings water, or surface water.

9. The composite material of claim 5, wherein the LDH or hydrotalcite precipitates at a bottom of a static water body, or at a downstream bottom of a flowing water body.

10. The composite material of claim 1, wherein a molar ratio between divalent metal ions and trivalent metal ions is controlled at 1:4.

11. The composite material of claim 1, wherein the composite material is pretreated with dilute HCl, so as to form core-shell micro-nano structures by coating LDH nanofilm on a surface of alloy for achieving more efficient remediation of contaminated water and/or soil.

12. The composite material of claim 1, wherein the composite material is used for soil remediation, having benefits of detoxifying heavy metals by immobilization, degrading organic pollutants chemically, improving soil pH buffer capacity, regulating soil microbial community, raising soil Mg and hydrogen fertility, soil porosity, air permeability and water retention, and improving nitrogen fixation by converting nitrate into ammonium, which is readily adsorbed on a surface of soil colloids to enter a lattice of clay minerals, and transform into guano stones.

13. The composite material of claim 1, wherein the composite material is pretreated using dilute HCl to form a micro-nano core-shell structure of Alloy@LDH for improving remediation efficiency.

14. The composite material of claim 1, wherein the composite materials is used for cleaning wastewater from acidic to alkaline pH conditions, and/or remedying soil from acidic to alkaline pH conditions.

* * * * *